United States Patent [19]

Zelickson

[11] Patent Number: 4,867,350
[45] Date of Patent: Sep. 19, 1989

[54] MEASURING AND DISPENSING APPARATUS

[76] Inventor: Barry M. Zelickson, 1309 Westwood Hill Rd., St. Louis Park, Minn. 55426

[21] Appl. No.: 174,343

[22] Filed: Mar. 28, 1988

[51] Int. Cl.$^4$ .............................................. G01F 11/10
[52] U.S. Cl. .................................. 222/235; 222/153; 222/361; 222/355
[58] Field of Search ............... 222/153, 239, 242, 185, 222/234, 235, 275, 276, 266-267, 288-289, 305, 282-284, 361, 366, 355; 141/371, 373, 358, 108-109

[56] References Cited

U.S. PATENT DOCUMENTS

| | | | |
|---|---|---|---|
| 464,823 | 12/1891 | Foster | 222/275 X |
| 1,980,057 | 11/1934 | Horkavi | 222/361 |
| 2,077,980 | 4/1937 | Bell | 222/235 X |
| 2,723,780 | 11/1955 | Clement | 141/373 X |
| 3,201,008 | 8/1965 | Morena | 222/361 |
| 4,531,658 | 7/1985 | Galopin | 222/185 X |
| 4,708,265 | 11/1987 | Bopst et al. | 222/284 X |

FOREIGN PATENT DOCUMENTS

| | | | |
|---|---|---|---|
| 83/03898 | 11/1983 | PCT Int'l Appl. | 222/284 |
| 310534 | 12/1955 | Switzerland | 222/361 |

Primary Examiner—Kevin P. Shaver
Assistant Examiner—Mona C. Beegle
Attorney, Agent, or Firm—Richard D. Allison

[57] ABSTRACT

A canister type of measuring and dispensing device wherein granular material is dispensed from a plurality of drawers and each drawer preferably has one open compartment and one closed compartment wherein the compartment dispenses a commonly used quantity of granular material and wherein each drawer is freely interchangeable with drawers having different dispensing dimensions.

9 Claims, 3 Drawing Sheets

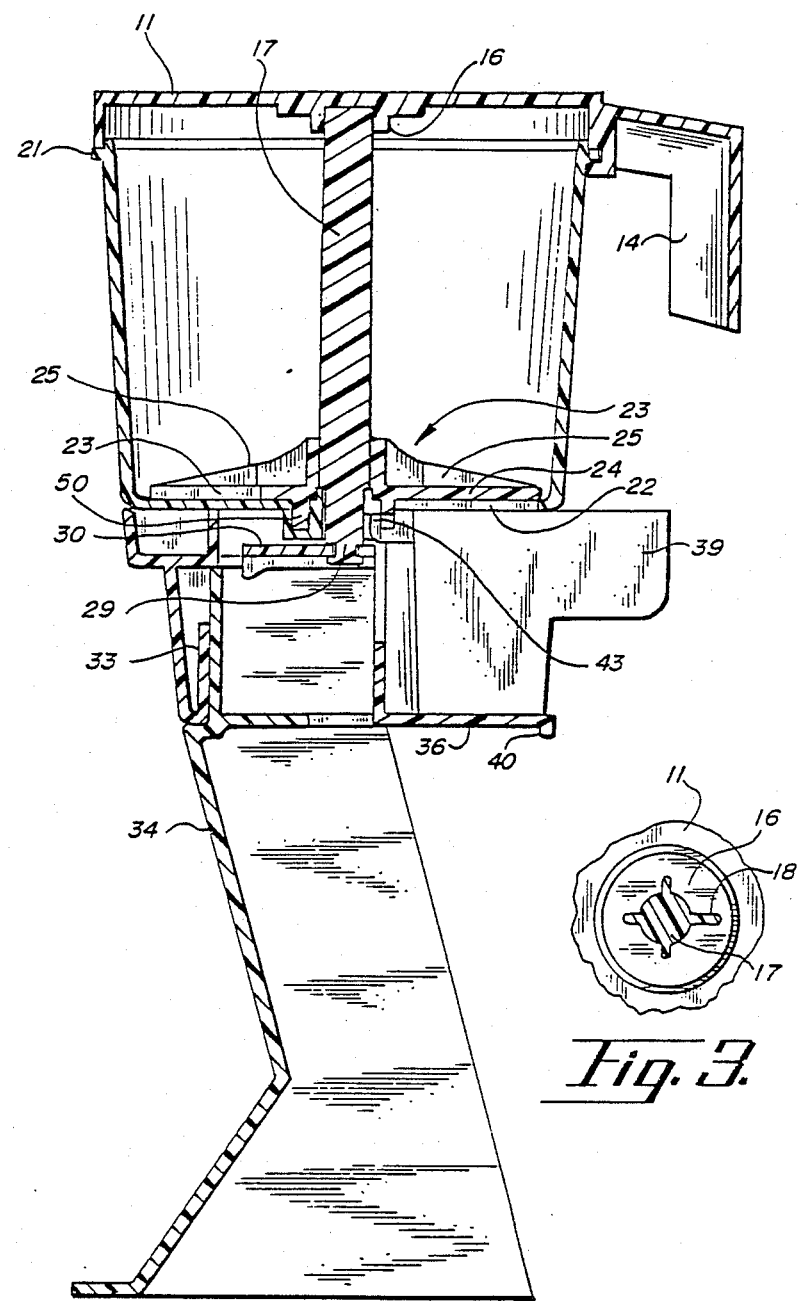

MEASURING AND DISPENSING APPARATUS

BACKGROUND OF THE INVENTION

The present invention relates to devices for measuring and dispensing granular materials and more particularly to a self-contained mountable dispensing and measuring device.

Prior art devices of the present type generally utilize a multi-compartment measuring chamber which reciprocates between fill and dispense positions. Other devices of this type incorporate a moveable wall in the dispensing compartment to provide for the measurement of varied quantities from a fixed size dispensing compartment.

One type of hand held variable capacity measuring device is disclosed in U.S. Pat. No. 4,071,171, issued to Bassignani on Jan. 31, 1978. Bassignani discloses an attachment wherein the granular material is stored in an upright container and must be inverted when granular materials are dispensed therefrom. This device also includes a pair of barrier members wherein one barrier blocks the dispensing end of the device while the dispensing compartment is filled and the other barrier member blocks the filling end of the device while the material is dispensed As with other devices, this device includes a moveable compartment wall to vary the quantity of material dispensed from the device.

Another general type of dispensing device is disclosed in U.S. Pat. No. 4,162,751 issued to Hetland et al., on July 31, 1979. The Hetland devices discloses the use of a rotary type dispensing compartment. The Hetland device is for use either as an upright dispensing container or as a hand held dispensing apparatus. In this device the dispensing compartment is a rotary type compartment which is physically rotated from a filling position to a dispensing position and includes a moveable compartment wall to provide for the dispensing of varied quantities of material.

Another general type of dispensing device is disclosed in U.S. Pat. No. 1,940,751 issued to Hermani on Dec. 26, 1933. The Hermani patent discloses a canister type of dispensing apparatus wherein a plurality of dispensing compartments are arranged so that while one compartment is dispensing the material, another compartment is simultaneously being filled. Additionally, the dispensing compartments of Hermani are of a fixed dimension and are not interchangeable.

SUMMARY OF THE INVENTION

An object of the present invention is to provide a measuring and dispensing device which is simple to operate and may be easily disassembled for cleaning.

Another object of the present invention is to provide a measuring and dispensing device which is inexpensive to manufacture and has relatively few operating parts.

The present invention has as its primary components a cover, a canister section and a removable dispensing section. The cover includes a handle and attaches to a centrally located mixing shaft. The canister section is designed to store the granular material and includes a mixing and filling lever along its lower surface. The mixing and filling lever is attached to the central shaft so that whenever the handle or the top cover is rotated, the mixing and filling lever rotates. The dispensing section consists of a pair of sliding drawers having dispensing compartments of a predetermined dimension. Each drawer has one compartment with an open bottom and another compartment with a closed bottom. Additionally, the drawers may be removed individually or in combination to pour the contents of the closed bottom drawers into a receptacle. The use of the various drawers enables the user to accurately measure a larger quantity of material by merely combining the contents of the various drawers.

A further feature of the present is a locking means to prevent the drawer from being opened unless the handle is in a specific position. Movement of the handle of the present invention rotates a central shaft which, in turn, rotates the mixing and filling lever. Movement of the mixing and filling lever operates to fill the dispensing compartments and also aligns a retaining ridge on the bottom end of the central shaft with locking tabs located on the inner surface of each pair of drawers. When the handle is in its normal closed position, the dispensing arm of the mixing and filling lever is positioned over the openings in the bottom of the canister to prevent the material from flowing into the dispensing compartment. In this position, the drawers may be freely removed from the apparatus. If the handle is in a filling or partially filling position, the retaining ridge on the bottom of the central shaft engages the locking tabs on the drawers and prevents their removal from the apparatus. This prevents the granular material from flowing out of the canister if the dispensing arm of the mixing and filling lever is not blocking the flow of granular material from the canister.

Another feature of the present invention is a locking lip on the top of the canister to prevent the top cover from being removed unless the handle is in the closed position. In the present invention, the handle includes an inwardly directed lip which engages a lip located on the top rim of the canister. The lip on the canister extends outwardly along nearly the entire top surface of the canister to prevent the removal of the top cover unless the handle in the closed position. Additionally, to prevent the handle and top cover from being aligned properly along the lip of the canister, the central shaft is designed to receive the top cover in only one orientation.

An advantage of the present invention is that it incorporates many of these safety features to prevent the inadvertent dispensing of material from the invention.

Another advantage of the present invention is that it provides dispensing compartments for dispensing the most commonly used quantities of granular material.

Another advantage of the present invention is that the sections of the drawers may be easily combined to dispense larger, commonly used quantities.

Another advantage of the present invention is that the drawers are interchangeable with drawers capable of dispensing other commonly used quantities.

BRIEF DESCRIPTION OF THE DRAWINGS

FIG. 2 is a cross-sectional view of the present invention take along lines 2—2 of FIG. 1.

FIG. 3 is a cross sectional view of the present invention taken along lines 3—3 of FIG. 1.

DESCRIPTION OF THE PREFERRED EMBODIMENT

Figure 1:
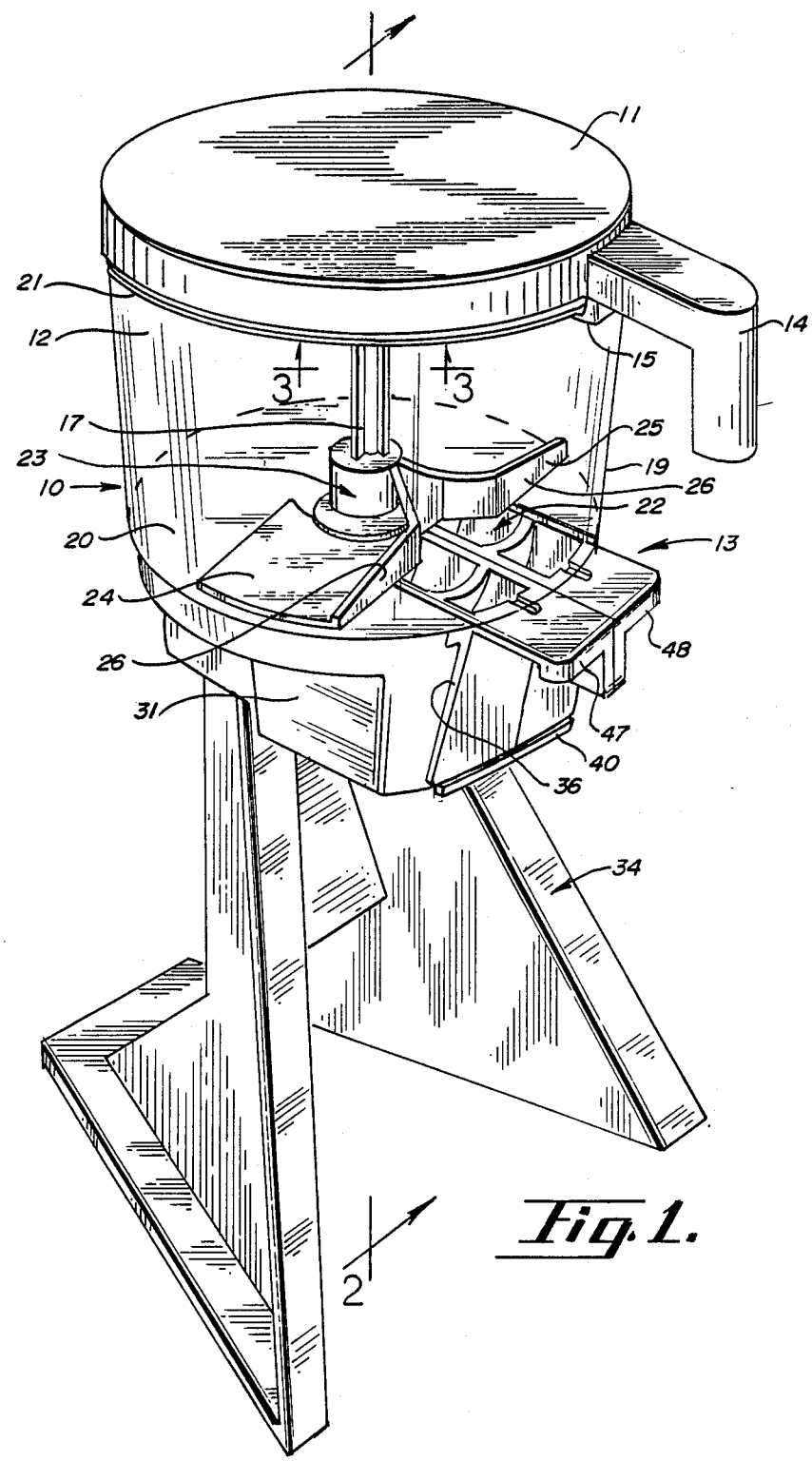
FIG. 1 is a perspective view of the present invention.
Figure 4:
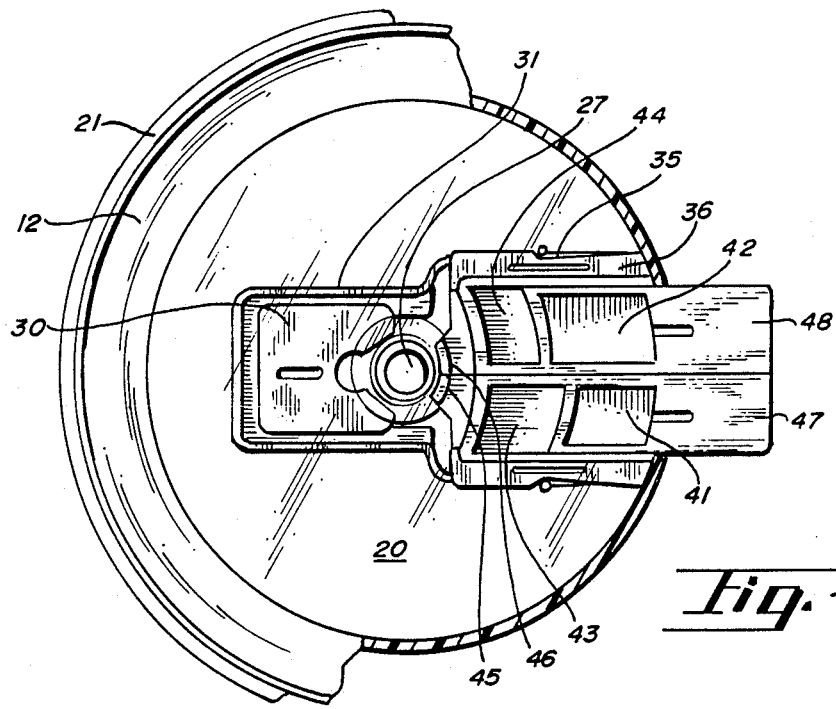
FIG. 4 is a bottom view of the canister section of the present invention.
Figure 5:
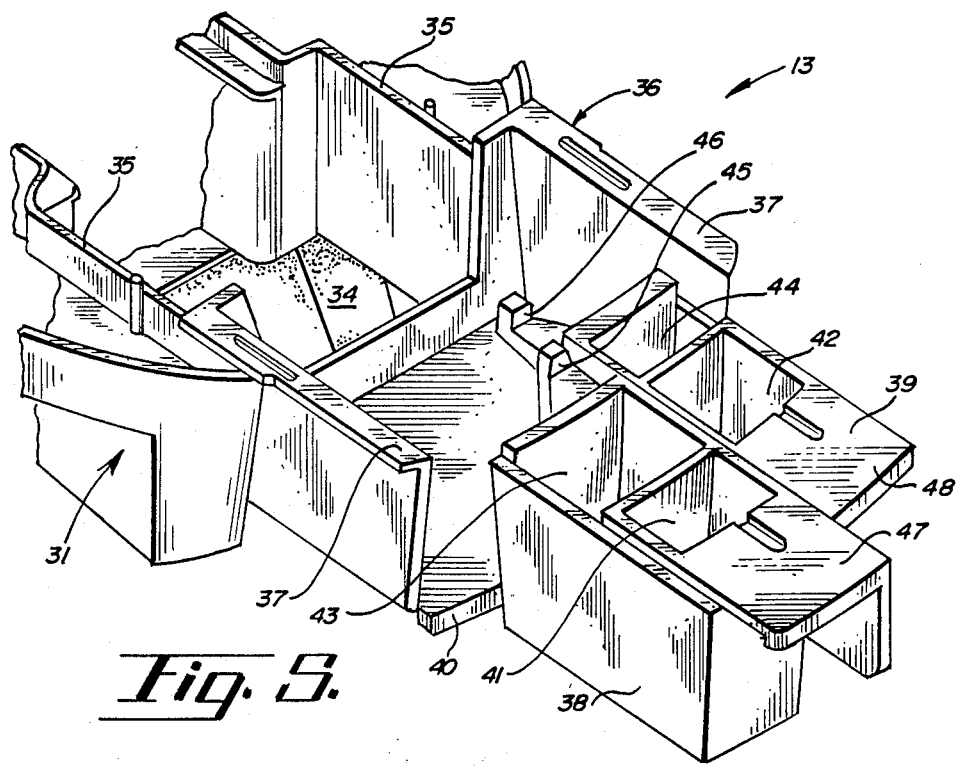
FIG. 5 is an exploded perspective view of the dispensing section of the present invention.

The present invention is a canister type measuring device preferably constructed of molded plastic and is referred to herein generally as 10. The measuring device 10 has as its primary elements, a cover 11, a canister 12 and a dispensing section 13. As illustrated in FIG. 1, the cover 11 removably attaches to the top of canister 12. The cover 11 includes a handle 14 and a retaining lip 15 to selectively retain the cover 11 on the top of the canister 12. A shaft engagement ring 16 is centrally located on the inner surface of cover 11. This engagement ring 16 engages the top end of central shaft 17. Central shaft 17 includes an alignment extension 18 to insure that cover 11 is attached to the top of canister 12 in the proper orientation.

The canister 12 includes tapered sidewalls 19 and canister bottom 20. Canister ridge 21 extends outwardly from nearly the entire circumference of the top rim of canister 12. The canister ridge 21 engages the retaining lip 15 to prevent the inadvertent removal of the cover 11 unless the cover 11 and handle 14 are in the closed position. The bottom 20 of the canister 12 includes a dispensing opening 22 and mixing lever 23. The mixing lever 23 is removably attached to the central shaft 17 and includes a dispensing arm 24 and a mixing arm 25 which extend outwardly from the central shaft 17 along the bottom 20 of the canister 12. Dispensing arm 24 extends outwardly from central shaft 17 in a generally flat rectangular shape of sufficient size to cover dispensing opening 21. Mixing arm 25 is preferably narrower than dispensing arm 24 and extends outwardly from the central shaft 17 in the dispensing arm 24. Dispensing arm 24 and mixing arm 25 include an upwardly extending mixing lip 26 to mix the contents of the canister 12 whenever central shaft 17 is rotated. Canister bottom 20 also includes a locking lip opening 27 which is located inwardly from the dispensing opening 22. Mixing lever 23 is designed to engage the alignment extension 18 of the central shaft 17 in a predetermined orientation.

Central shaft 17 extends downwardly from the shaft engagement ring 16 of the top cover 11; through mixing lever 23 and extends through the bottom 20 of canister 12. Central shaft 17 extends downwardly through the locking lip opening 27 in the bottom 20 of canister 12 and into the top of dispensing section 13. The bottom end of central shaft 17 includes an engagement knob 29 onto which a removable clip 30 is attached. The addition of the removable clip 30 to the bottom of central shaft 17 operates to hold the central shaft 17 in a relatively fixed position while still allowing the central shaft 17 to rotate horizontally.

The dispensing section 13 includes an upper bracket area 31 which is attached to the bottom 20 of canister 12. The back section of bracket 31 includes a stand indent 33 for the removable insertion of a canister stand 34 therein. The front section of bracket 31 in combination with the bottom 20 of canister 12 forms a ridge 35 for the slidable insertion of the drawer holder 36 therein. The drawer holder 36 includes an upper retaining lip 37 and encloses the sides and bottom of the first and second drawers 38 and 39, respectively. Additionally, the drawer holder 36 includes a handle 40 for the convenient removal of the drawer holder 36 from the ridge 31. The first and second drawers 38 and 39, respectively, are each divided into front and back dispensing compartments. The front dispensing compartments of each drawer are open compartments 41 and 42, respectively, and consist of sidewalls only. The innermost dispensing compartments are closed compartments 43 and 44, respectively, and consist of sidewalls and bottom walls. Additionally, first and second drawers 38 and 39, respectively, include locking tabs 45 and 46 extending inwardly from the top innermost surface of each drawer.

In the preferred embodiment, the first drawer 38 includes a front handle 47 and is designed so that when open drawer 41 is filled, open drawer 41 it contains one-quarter cup of granular material and when closed drawer 43 is filled, closed drawer 43 contains one-quarter cup of granular material. The second drawer 39 includes a front handle 48 and is designed so that when open drawer 42 is filled, it contains one-third cup of granular material. When closed drawer 44 is filled, it contains one sixth cup of granular material. It is to be understood that one featured of this invention is that each individual drawer or each pair of drawers may be easily interchanged so that the respective drawers may measure and dispense whatever convenient quantity is desired.

In operation, the operator fills the canister 12 with whatever granular material they desire. Cover 11 is then attached to the top of canister 12 and handle 14 is rotated to fill the dispensing section 13 with granular material. Rotation of handle 14 operates to move central shaft 17 which, in turn, moves mixing lever 23. When mixing lever 23 is moved from its normal position wherein the dispensing arm 24 covers dispensing opening 22, the granular material flows through dispensing opening 22 and into the first and second drawers 38 and 39, respectively. If the operator desires one-quarter cup of granular material, the first drawer 37 may be pulled forward and one-quarter cup of granular material will be dispensed from the bottom of open drawer 41. If the operator desires one-half cup of granular material, the first drawer 38 may be pulled forward to dispense one-quarter cup and then first drawer 38 is removed inverted so as to dispense the remaining one-quarter cup from closed drawer 43. If the operator desires one-third cup, the second drawer 39 may be pulled forward and open drawer 42 will dispense one-third cup of granular material. If the operator desires one-half cup of granular material from this side, the second drawer 39 may be pulled forward and open drawer 42 will dispense one-third cup and then second drawer 39 may be removed and inverted so as to dispense the remaining one-sixth cup from closed drawer 44. Additionally, if the operator desires two-thirds cup granular material, second drawer 39 may be pulled forward twice so as to allow open drawer 42 to dispense one-third cup of granular material twice while rotating handle 14 between each dispensing.

The measuring device 10 of the present invention is specifically designed to prevent the inadvertent spilling or dispensing of granular material therefrom. The top cover 11 and handle 14 include a lip 15 which engages the canister ridge 21 on the canister 12 to prevent the removal of cover 11 unless the handle 14 is in its closed position. When handle 14 is in its closed position, the dispensing arm 24 of the mixing lever 23 is covering dispensing opening 22.

Another feature of the present invention prevents the removal of the first and second drawers 38 and 39, respectively, from drawer holder 36 unless handle 14 is in its closed position. This is accomplished by the annular ridge 50 located on the bottom of central shaft 17. When handle 14 is not in its closed position, annular ridge 50 engages the locking tabs 45 and 46 located on the inner surface of the first and second drawers 38 and 39, respectively, thereby preventing the dispensing granular material from the canister 12 whenever dispensing arm 24 is not covering dispensing opening 22.

What is claimed:

1. A measuring and dispensing device comprising
   a generally U-shaped drawer holder having bottom and sidewalls,
   said drawer holder retaining at least one moveable drawer therein,
   said drawer being moveable between open and closed positions and having a plurality of dispensing compartments therein,
   a first dispensing compartment having side walls and open top and bottom ends for the filling of said first dispensing compartment through the top end of said first dispensing compartment when said drawer is in the closed position and the dispensing of the contents of said first dispensing compartment through the bottom end of said dispensing compartment when said drawer is in the open position,
   a second dispensing compartment having sidewalls and a bottom wall and an open top end for the filling of said second dispensing compartment through the top end of said second dispensing compartment when said drawer is in the closed position and the dispensing of the contents of said second dispensing compartment when said drawer is in the open position,
   a material containing canister mountable in flow communication with said drawer holder and drawer wherein said canister has a bottom section with an outlet thereon for the dispensing of material therethrough,
   a moveable flow preventing means in the bottom section of said canister to selectively obstruct the flow of material through said outlet, and
   an engagement means on said drawer to prevent the removal of said drawer from said dispensing section unless said flow preventing means is obstructing said outlet.

2. The dispensing section of claim 1, wherein said drawer has a locking tab thereon which engages a groove on said canister to prevent the dispensing of the contents from said drawer unless the flow of material through said outlet into said drawer is obstructed by the flow preventing means.

3. The measuring and dispensing device of claim 1, wherein said dispensing section is mounted on the bottom of a granular or powdered material containing canister and said flow preventing means on said canister comprising a mixing lever and wherein said mixing lever is in flow communication with said outlet and said drawer.

4. A canister type of measuring and dispensing device, comprising
   a canister having top and bottom ends for the storage of various granular and powdered materials therein,
   said top end of said canister having an engagement lip thereon for the removable attachment of a rotatable cover thereto,
   a rotatable shaft extending from said top cover through the bottom end of the canister for the rotatable movement of a mixing lever thereon,
   said mixing lever on said shaft for mixing the material in said canister and dispensing the material from the canister into a dispensing section through a dispensing outlet on said canister and wherein in one position said mixing lever obstructs the dispensing outlet, said dispensing section including at least one drawer in flow communication with said dispensing outlet,
   said drawer arranged to dispense a measured amount of material from said canister when said drawer is removed from said dispensing section, and
   said cover including means thereon for engaging said engagement lip to prevent the removal of said cover from the top end of said canister unless said mixing lever is obstructing said dispensing outlet.

5. The measuring and dispensing device of claim 4, wherein said mixing lever comprises a dispensing arm and a mixing arm wherein the dispensing arm and mixing arm extend outwardly from said shaft and include an upwardly extending mixing lip thereon.

6. The measuring and dispensing device of claim 4, wherein a plurality of slidable drawers are enclosed in a removable drawer holder.

7. A canister-type of measuring and dispensing device, comprising
   a canister for storing and dispensing various granular and powdered materials and having top and bottom ends,
   a removable cover attached to the top end of said canister,
   said bottom end of said canister having a dispensing outlet therein and a dispensing section mounted thereon,
   a rotatable shaft extending from said top cover through said bottom end into an engaging relation with said dispensing section,
   a mixing lever in rotatable engagement with said shaft near the bottom end of said canister,
   said dispensing section in flow communication with said dispensing outlet and including at least one drawer therein to receive the contents of said canister,
   said drawer oriented in slidable engagement with said dispensing section for the dispensing of the contents of said drawer therefrom, and
   said drawer having an engagement means thereon to prevent the removal from said dispensing section unless said mixing lever is engaged with said dispensing outlet to prevent the flow of material therethrough.

8. The measuring and dispensing device of claim 7, wherein the top end of said canister includes an outwardly extending ridge thereon for removable engagement with an inwardly directed lip on said top cover.

9. The measuring and dispensing device of claim 7, wherein said mixing lever is comprised of a dispensing arm and a mixing arm extending outwardly from said shaft near the bottom end of said canister.

* * * * *